United States Patent [19]

Nedreski

[11] 4,137,677
[45] Feb. 6, 1979

[54] CONSTANT HORSEPOWER CONTROL FOR GRINDING WHEEL DRIVES

[75] Inventor: Robert J. Nedreski, Erie, Pa.

[73] Assignee: General Electric Company, Erie, Pa.

[21] Appl. No.: 838,739

[22] Filed: Oct. 3, 1977

[51] Int. Cl.² .............................................. B24B 49/16
[52] U.S. Cl. ............................ 51/165.77; 51/134.5 R; 51/165.92
[58] Field of Search ............ 51/165 R, 165.77, 165.8, 51/165.71, 165.9, 165.92, 134.5 R

[56] References Cited

U.S. PATENT DOCUMENTS

| | | | |
|---|---|---|---|
| 3,178,861 | 4/1965 | Milas | 51/165.71 |
| 3,264,788 | 8/1966 | Coes | 51/281 R |
| 3,798,846 | 3/1974 | Smith | 51/134.5 R |
| 3,935,677 | 2/1976 | Swiatlowski | 51/134.5 R |
| 4,014,142 | 3/1977 | Coes | 51/165.77 |

*Primary Examiner*—Harold D. Whitehead
*Attorney, Agent, or Firm*—Arnold E. Renner

[57] ABSTRACT

A constant horsepower drive system for a grinding wheel includes a first motor and associated control for rotating the wheel at a constant peripheral or surface speed and a second motor and associated control for providing linear relative motion between the wheel and a workpiece. Constant horsepower operation below the rated or base speed of the first motor is achieved by controlling the relative position of the wheel and the workpiece through the operation of the second motor. The control of the second motor is effected by the development of a correction signal which is a function of the quotient of a signal value representing the desired wheel surface speed divided by a second signal representing the counter electromotive force of the first motor.

9 Claims, 2 Drawing Figures

CONSTANT HORSEPOWER CONTROL FOR GRINDING WHEEL DRIVES

BACKGROUND OF THE INVENTION

The present invention relates generally to grinding wheel drive systems and more particularly to a grinding wheel drive system in which the grinding is performed at a constant power level.

It has long been known that improved grinding results can be obtained by maintaining the peripheral or surface speed of the grinding wheel constant. Because the wheel diameter decreases with use, these grinding systems require a variable speed drive so that as the diameter of the wheel gets smaller the rotational speed is increased proportionally. More recently it has been learned that in certain applications it is also desirable to maintain the grinding at a constant power (e.g., watts or horsepower) level, proportional to the desired surface speed.

That a constant surface speed alone will not necessarily achieve a constant power and grinding level becomes obvious when it is realized that the power put into a grinding operation is a function not only of the wheel surface speed but also the force or pressure of the contact between the wheel and the workpiece. The maintenance of constant power grinding would present no problem if one could provide constant surface speed on the wheel and constant pressure between the wheel and the workpiece. Many methods of maintaining constant surface speed are known, but the difficulty occurs in finding a suitable means of measuring pressure. The use of load cells, scales, etc., is not always feasible since in many grinding machines, the weight of the supporting means is many times the pressure it is desired to measure. On some types of grinding machines, the armature current of the motor which rotates the grinding wheel has been used to measure the pressure. This is quite satisfactory since the armature current is directly proportional to the pressure on the grinding wheel. However, by virtue of the changing torque arm, the armature current is also inversely proportional to the radius of the grinding wheel for a given pressure, such that, as the wheel wears down, the current corresponding to a given pressure changes according to a definite law. Thus, if the grinding wheel is moved normal to the work surface to maintain constant armature current, grinding power will be constant only so long as constant surface speed is maintained and wheel diameter does not change.

It is also known that certain motors will operate at constant horsepower output under certain conditions. The d.c. shunt motor with separate field excitation is an example of such a motor when the motor is operated at above its rated or based speed. The use of such a motor solely in this mode is not, however, entirely satisfactory for all grinding applications. Speeds above the base speed of such a motor may be too high for the desired grinding operation and the use of speed reduction apparatus such as gears is not a sufficiently accurate or satisfactory way of achieving the speed reduction. In addition, the d.c. shunt motor with separate field excitation has a tendency to exhibit stability problems when operated in the constant horsepower region above rated base speed such that even though there are various methods for lessening this problem, the overall control is not as completely satisfactory as desired.

SUMMARY OF THE INVENTION

It is, therefore, an object of the present invention to provide an improved grinding wheel drive.

It is a further object to provide a grinding wheel drive in which the grinding power remains substantially constant.

It is another object to provide a grinding wheel drive in which the grinding power is maintained substantially constant by regulating the wheel/workpiece pressure.

It is a still further object to provide a grinding wheel drive in which the grinding power is maintained substantially constant by maintaining the wheel surface speed substantially constant and regulating the wheel/workpiece contact pressure in response to sensed system parameters.

The foregoing and other objects are achieved, in accordance with the present invention, by providing a first motor and associated control for rotating the wheel at a constant peripheral or surface speed and a second motor and associated control for providing linear relative motion between the wheel and workpiece. Operation of the grinding drive to provide constant power of grinding is achieved by positioning the wheel and workpiece relative to one another through the control of the second motor. This control is effected by the development of a correction signal which is a function of the quotient of a signal having a value representing the desired wheel surface speed and a second signal representing the counter electromotive force (CEMF) of the first motor.

BRIEF DESCRIPTION OF THE DRAWING

While the present invention is described in particularity in the claims annexed to and forming a part of this specification, a better understanding of the invention can be had by reference to the following description taken in conjunction with the accompanying drawing in which:

DETAILED DESCRIPTION

Figure 1:
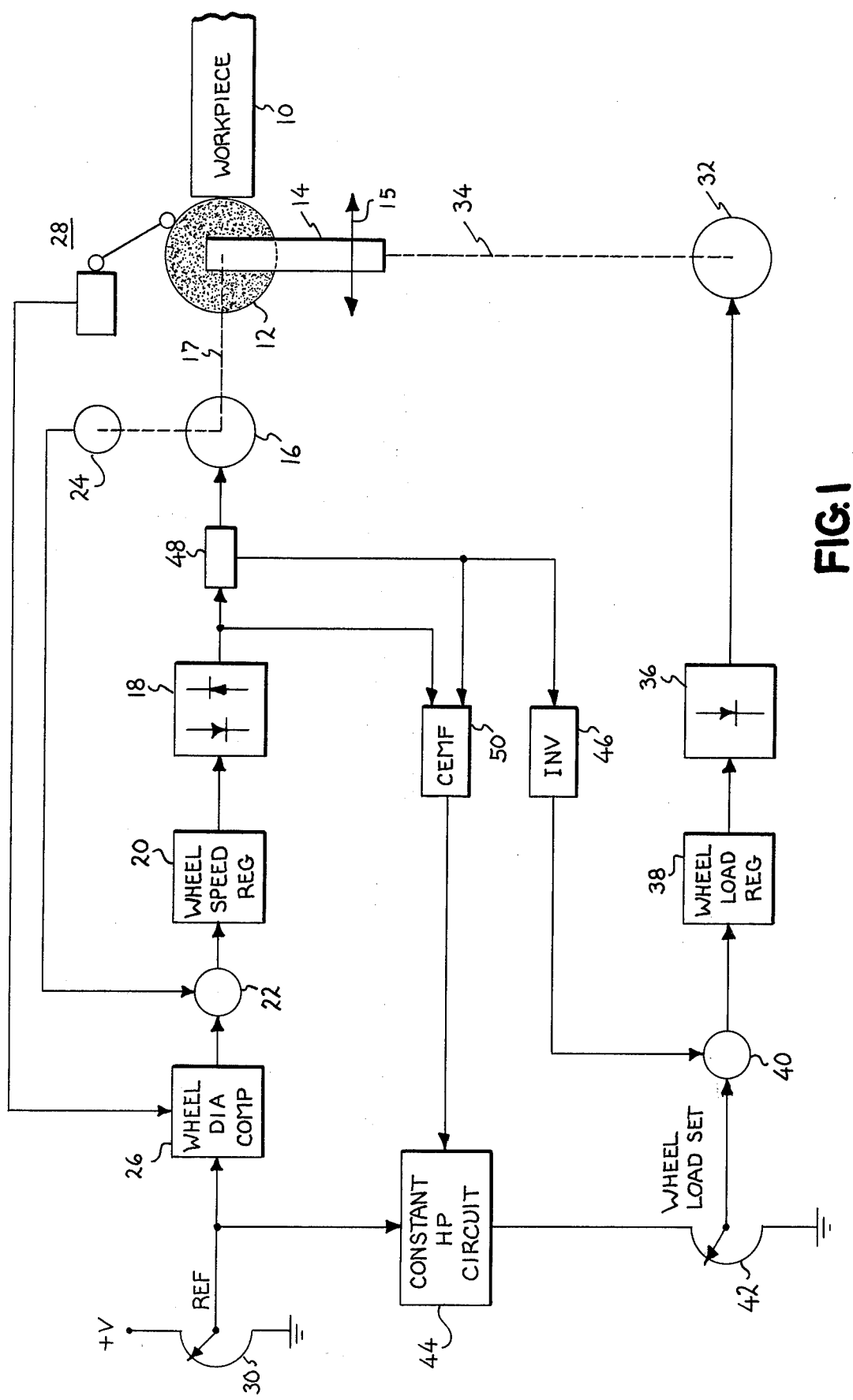
FIG. 1 is a schematic block diagram illustrating the drive system of the present invention in its preferred embodiment; and, FIG. 2 is a schematic diagram showing in detail a one of the components shown in block form in FIG. 1.

Referencing now FIG. 1 there is shown a workpiece 10 upon which a grinding operation is being performed by virtue of a grinding wheel 12 which is mounted for rotational motion as well as linear motion with respect to the workpiece 10 by way of suitable supporting means diagrammatically illustrated by the support 14. The grinding wheel 12 is provided with rotational motion by being mechanically connected to a suitable motor 16 as is indicated by the dashed line 17. Motor 16, in the preferred embodiment, is a d.c. shunt motor with separate field excitation. As is known, a d.c. shunt motor can have its speed varied below its base speed by varying the armature voltage and to this end there is provided a suitable power conversion means represented by the block 18. The exact nature of the power conversion unit 18 is not critical to the present invention and could be any of those well known in the art such as a 6-SCR bridge operated under phase control; that is, the firing angles of the bridge SCRs are varied with respect to the a.c. source (not shown) so as to vary the output voltage of the bridge all as known in the art.

Control of the conversion unit 18; i.e., the output voltage, is under the direction of a wheel speed regulator 20 which may be any of those well known in the art which outputs firing signals to the bridge 18 at the appropriate time to fire the SCRs of the bridge to govern the output voltage. The regulator 20 acts in response to an input voltage which is derived from a summing junction 22. The summing junction 22 is provided with two inputs the first of which is proportional to the actual motor speed. In the embodiment illustrated, this signal is derived from a tachometer 24 which is connected to the motor.

The second input to the summing junction 22 is from a wheel diameter compensation circuit 26. As is known, a grinding wheel wears down with use such that its diameter decreases. Thus, if constant peripheral or surface speed is to be maintained, there must be some means to compensate or adjust for the decrease in diameter. That is, the rotational speed of the wheel must be increased as its diameter decreases. To this end, there is provided some suitable means illustrated graphically as a sensing means 28 which will provide an output signal proportional to the wheel diameter. Such sensing means are well known and include optical systems as well as mechanical systems which actually contact the surface and provide an output signal. Regardless of the method employed, there is provided to the wheel diameter compensation circuit 26 a signal from the sensor 28 which is proportional to the wheel diameter. The wheel diameter compensation circuit 26 receives a second signal from a suitable reference source which, for purposes of simplicity is shown as a potentiometer 30 connected between a source of positive potential (+V) and ground. As illustrated, the wiper arm of the potentiometer 30 provides an input to the wheel diameter compensation circuit 26 and this signal is set to be proportional to the desired surface speed of the wheel 12. It is to be expressly understood that potentiometer 30, as a means of providing the reference, is representative of any desired system and while it could in fact be a hand adjustable reference signal, it could also be derived from other more sophisticated means such as the output of a data processing unit which governs the overall control of the grinding operation. Other means, of course, could be used. In any case, the function of the wheel diameter compensation circuit 26 is to provide compensation to the reference signal to adjust the level of that signal for changes in the grinding wheel diameter. The description thus far is that of what is known in the art and is commonly referred to as a constant surface speed grinding system.

As previously indicated, in the embodiment here being described, the grinding wheel is mounted for linear motion normal to the workpiece 10 as indicated by arrows 15. This motion is supplied by means of a motor 32 which is mechanically connected to the support system 14 as indicated by the dashed line 34. Motor 32 is preferably a reversible d.c. motor and is supplied with power from a power conversion unit 36 which may be any of those known in the art capable of providing bidirectional power to the motor. For example, unit 36 may be a simple half wave drive or, depending upon the size of the motor, a more complex system such as a three phase 6-SCR bridge similar to that described with respect to unit 18 above but having reverse capabilities. The output of the power supply 36 is controlled by an input signal from a wheel load regulator 38 which, similarly to the regulator 20 previously described, serves to control the amount of power from the supply 36. In this instance, however, the control signal from regulator 38 will also determine the polarity of power output and hence the direction of motor rotation. Regulator 38 may be any of those common and well known in the art and receives an input signal from a summing junction 40 which signal will have both a polarity and magnitude. The polarity of this input signal defines motor direction while the magnitude will govern the magnitude of power supplied to the motor and hence motor speed.

Summing junction 40 has two inputs. The first of these is from the wiper arm of a potentiometer 42 which is here termed a "wheel load set". The setting of this potentiometer may be either manual or automatically controlled and is such that with a given voltage applied across the potentiometer to ground the input to the summing junction 40 wil be of a magnitude to provide the desired power of the grinding operation. The input to the potentiometer 42 is a positive voltage signal from a constant horsepower circuit 44 the details of which will be explained later. The second input to the summing junction 40 is the output of an inverter 46 which receives its input from a sensing means 48 associated with the power line from the bridge 18 to motor 16. Sensor 48 serves to output a voltage which is proportional to the armature current of motor 16. In its simplest form, sensor 48 might be a simple, well-known low resistance shunt. The output from the sensor 48 is applied to the inverter 46 which serves no function other than to provide at its output the negative of the positive value from 48. That is, in that it is desired to have an error signal representative of the difference of the two inputs to the summing junction 40 and inasmuch as the output from the potentiometer 42 as illustrated is positive, it is required that a negative voltage be applied as the second input. Therefore, inverter 46 could comprise nothing more than an operational amplifier connected in the inversion mode with a unity gain all in a manner well known in the art. one input to a CEMF circuit 50 which receives a second input which is the terminal voltage of the motor 16. The CEMF circuit subtracts the IR drop of the motor from the terminal voltage to provide a signal proportional to the CEMF of the motor. Such circuits are well known in the art and are not believed to require further explanation here. The output of the CEMF circuit 50 is, as was indicated, a signal proportional to the actual CEMF of the motor and forms one input to the constant horsepower circuit 44. A second input to the constant horsepower circuit 44 is the reference signal from potentiometer 30.

Figure 2:
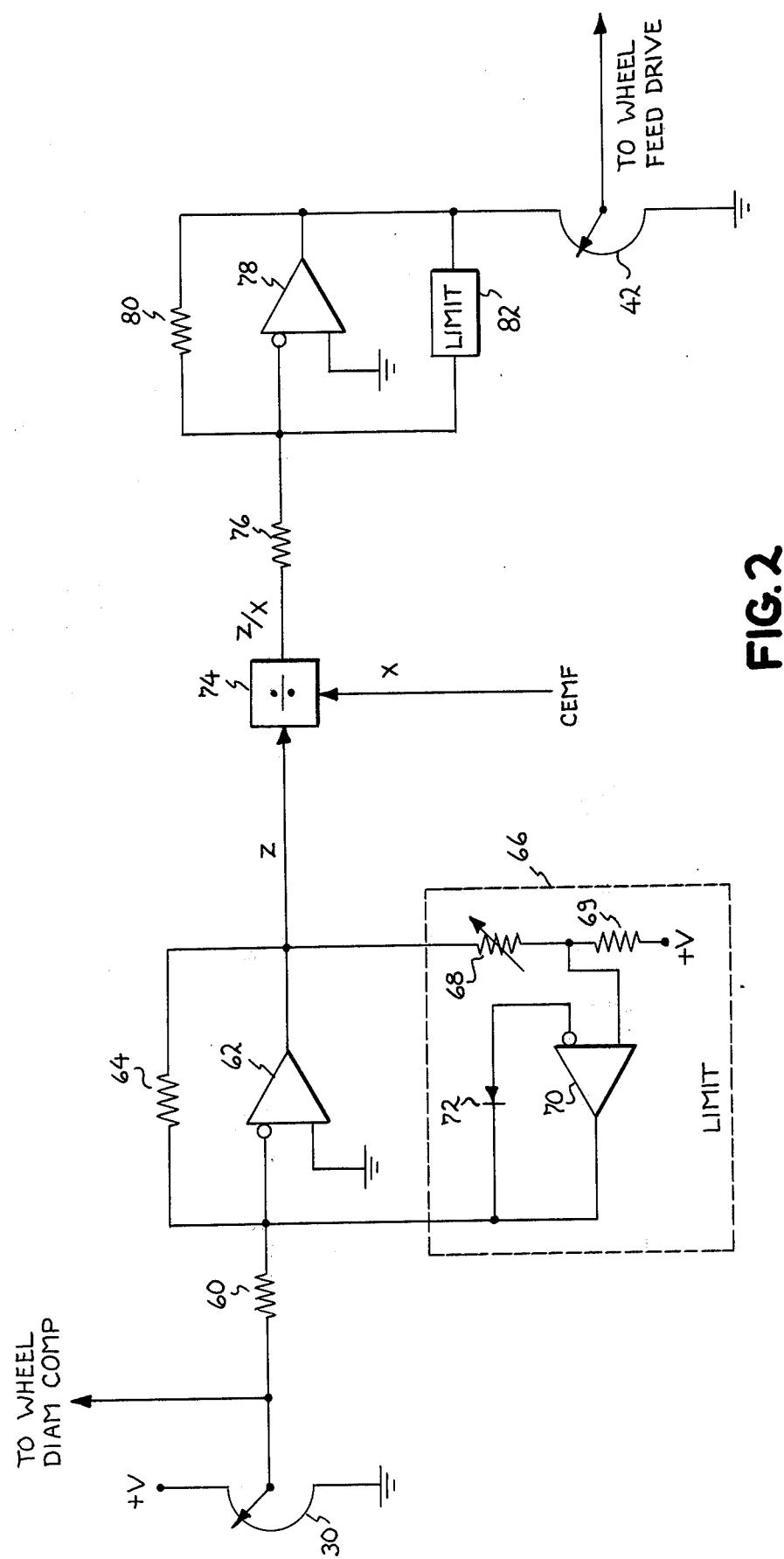

Circuit 44 functions to provide a variable voltage to the wheel load set reference potentiometer 42 to thereby vary the voltage supplied from the potentiometer 42 to the summing junction 40 to control the operation of the motor 32 and hence adjust the position of the grinding wheel 12 with respect to the workpiece. FIG. 2 illustrates in detail the composition of the constant horsepower circuit 44 shown in block form in FIG. 1. As points of reference, the two potentiometers 30 and 42 are also included in the FIG. 2 depiction. Referring now to FIG. 2, it is seen that the reference signal from potentiometer 30 forms an input by way of a resistor 60 to the inverting input of an operational amplifier 62 which has a feedback resistor 64 connected between its output and its inverting input. While it is possible to make this operational amplifier have variable gain by making resistor 60 and/or 64 adjustable, in the preferred embodiment the amplifier has a unity gain subject to a "limit" to be discussed hereinafter. Thus, resistors 60 and 64 would be of the same value. The noninverting input of amplifier 62 is connected to ground. A limit circuit indicated generally at 66 is also connected between the output and the inverting input of amplifier 62. This limit circuit is used to insure that the output of the amplifier does not exceed a predetermined value and if the amplifier inherently saturated at a point sufficiently low so as to not affect the following circuitry, the limit circuit could be omitted. However, for purposes of completeness, the limit circuit has been shown and includes a variable resistor 68 as input resistor to the noninverting input of an additional operational amplifier 70 which input is further connected to a source of positive potential (+V) by way of a resistor 69. Resistor 68 is made variable so that, if desired, the limit is variable. The limitation feature is achieved by providing a feedback diode between the output and inverting input of the amplifier 70 all in the manner well known in the art. In that the output of amplifier 62 in the embodiment presently being discussed is a negative value due to its positive input, the diode 72 is poled in the same direction as the operational amplifier.

Amplifier 62 and its related circuitry performs the function of isolation and provides an output Z which is of the same magnitude as the input but inverted and isolated therefrom. The Z output of amplifier 62 forms one input to a divider 74 which, in the presently being described embodiment, is a standard analog divider such as is sold by Analog Devices, Inc. of Norwood, Mass. under their catalog No. 436A. An alternative divider which could also be used is that sold by Burr Brown Research Corporation of Tuscon, Ariz. under its catalog No. 4291J. Other appropriate dividers could also be used. The second input to the divider 74 is the CEMF signal which was derived from the CEMF circuit 50 of FIG. 1. Thus, the output of the divider 74 is the quotient of the reference signal divided by the feedback CEMF signal. In actuality, this quotient will be the negative due to the inversion of the reference signal by way of amplifier 62 but this is merely a sign change and insignificant in the present invention.

The output of divider 74 is provided by way of an input resistor 76 to an inverting operational amplifier 78 which has a feedback resistor 80 connected between its output and inverting input. A limit circuit 82, which may be of the same general type as that shown at 66 with respect to amplifier 62, may be connected between the output and inverting input of amplifier 78. The gain of amplifier 78 may be made variable by making one of the resistors 76 or 78 variable but in the preferred embodiment, as was the earlier case, these resistors are of the same value and hence the amplifier 78 and its associated circuit performs a second inversion at unity gain. Thus, the output of amplifier 78 supplied to the potentiometer 42 is a positive signal having a magnitude which is the result of the division operation by the divider 74; that is, the quotient of the surface speed reference signal from potentiometer 30 divided by the CEMF signal. As earlier indicated with respect to FIG. 1, the signal taken from the wiper arm of the potentiometer 42 is applied to the summing junction 40 of FIG. 1 to provide the control or error signal earlier described.

Before beginning a description of the operation of the present invention as shown by FIGS. 1 and 2 it is believed well to state certain well-known facts which, when kept in mind, help in the understanding of the operation of the present invention. With regard to any motor and in the present instance with regard to the rotational motor 16, it is known that the product of the armature current and the CEMF will result in the output of the motor, in watts, which may also be expressed as horsepower. It is further known that, in the case of d.c. shunt motor with separate field excitation operating in the constant torque range (i.e., below base or rated speed) with a constant applied armature voltage, the CEMF will be proportional to the motor speed and the armature current will be proportional to the load. Thus, it is seen that if the product of the CEMF and the armature current of the motor is maintained constant, there will be a constant power output from the motor.

Referring now to FIGS. 1 and 2, let it be assumed that the grinding wheel wears down to a smaller diameter. The wheel diameter compensation circuit 26 increases the rotational speed of motor 16 to maintain constant surface speed. With an increase in the rotational speed, assuming the motor is operating below base speed, the CEMF will increase proportionately. If armature current of motor 16 is maintained constant, the product of current and CEMF will increase, which provides increased power. Also, as stated earlier, the armature current for constant pressure is inversely proportional to the diameter of the grinding wheel. Accordingly, if armature current is maintained constant, the pressure will increase. While this is happening, however, the increase in CEMF as determined by circuit 50 would be applied to the constant power circuit 44.

Referencing particularly FIG. 2, it is seen that of the two terms applied to the divider 74, that originating as the reference signal from potentiometer 30 remains constant. The CEMF signal under the circumstances here being described did increase and, therefore, the quotient (Z/X) will decrease. This decreased quotient when applied to the wheel load reference potentiometer 42 by way of amplifier 78 will result in a lower signal applied by way of the summing junction 40 to the wheel load regulator 38. In response to this lower signal, regulator 38 will cause the power supply 36 to output a voltage to the motor 32 which results in the motor 32 pulling the wheel away from the workpiece. The result of this action is that the load on motor 16 will be decreased. The wheel motor armature current will decrease, corresponding to the smaller diameter. The quotient (Z/X) will return to the initial value and the motor 32 will stop, thus holding the motor 16 armature current at the new, lower value until the wheel wears down further. Thus, it is seen that through the interaction of the wheel speed regulation circuit as well as the wheel position regulation circuit the total power of grinding is maintained constant.

One additional advantage of the present system which is perhaps not immediately obvious is that, when motor 16 is a d.c. shunt motor with separate field excitation, the use of the CEMF as opposed to some other signal such as a tachometer voltage results in automatic disablement of the position control circuit when the motor 16 is run above base speed where the motor inherently operates in a constant horsepower mode. This may be understood when it is realized that in the constant horsepower mode the CEMF of the motor remains constant regardless of speed. Thus, the only potential variable to the grinding wheel position control is constant and in this range the system for wheel positioning becomes, in effect, inoperative.

From the foregoing, it is seen that there has been provided a system which maintains constant grinding power throughout a wide speed range both below and even above the base speed of the motor which drives the grinding wheel in rotational motion.

While there has been shown and described what is at present considered to be the preferred embodiment of the present invention, modifications thereto will readily occur to those skilled in the art. For example, while in the illustrated embodiment the wheel position control was shown and described as acting upon the wheel to provide relative linear motion between the wheel and the workpiece, it is obvious that in certain instances and with no changes in concept and only moderate changes in design the position control, i.e., motor 32 in FIG. 1, could be made to move the workpiece with equal facility and to achieve the identical results. Also, hydraulic or pneumatic means could be used to move the wheel on the workpiece, with the same result. It is also apparent that while the system was shown and described in analog form, digital implementation could be employed without departing from the concepts of the invention. It is not desired, therefore, that the invention be limited to the specific embodiment shown and described and it is intended to cover in the appended claims all such modifications as fall within the true spirit and scope of the invention.

What is claimed is:

1. In a drive system for a grinding wheel of the type including a first motor and associated control for rotating the wheel at a constant surface speed and a second motor and associated control for providing linear motion between the wheel and the workpiece; an improved control for maintaining constant grinding power comprising:
   (a) means to provide a first signal proportional to the counter electromotive force of the first motor;
   (b) means to provide a reference signal proportional to a desired surface speed of the grinding wheel;
   (c) means to develop a second signal proportional to the quotient of said reference signal divided by said first signal; and,
   (d) means to apply said second signal to the associated control for the second motor to effect control of the relative position of the wheel and the workpiece to thereby vary the pressure between the wheel and the workpiece and maintain substantially constant grinding power.

2. A constant horsepower drive for a grinding wheel comprising:
   (a) a first motor for rotating the wheel;
   (b) a first control for controlling the speed of said first motor whereby said wheel is rotated at a substantially constant surface speed;
   (c) a second motor for providing linear relative motion between said wheel and a workpiece; and,
   (d) a second control for maintaining substantially constant horsepower at the grinding surface of said wheel and workpiece, said second control comprising,
   (1) means to provide a first signal proportional to the counter electromotive force of the first motor,
   (2) means to provide a reference signal proportional to a desired surface speed of the grinding wheel,
   (3) means to develop a second signal proportional to the quotient of said reference signal divided by said first signal; and,
   (4) means to apply said second signal to the associated control for the second motor to effect control of the relative position of the wheel and the workpiece to thereby vary the pressure between the wheel and the workpiece and maintain substantially constant horsepower at the grinding surface.

3. The invention in accordance with claim 2 wherein said second motor is connected to and acts to move said grinding wheel with respect to the workpiece.

4. The invention in accordance with claim 2 wherein said first motor is a d.c. shunt motor.

5. The invention in accordance with claim 2 wherein said means to provide said first signal is responsive to the terminal voltage and armature current of said first motor.

6. The invention in accordance with claim 2 wherein said means to develop said second signal includes the series arrangement of a first isolating amplifier, a dividing circuit and a second isolating amplifier.

7. In a drive system for a grinding wheel of the type including a first motor and associated control for rotating the wheel at a constant surface speed and a second motor and associated control for providing linear motion between the wheel and the workpiece; and improved control for maitaining constant grinding power comprising:
   (a) means to provide a first signal proportional to the counter electromotive force of the first motor;
   (b) means to provide a reference signal proportional to a desired surface speed of the grinding wheel;
   (c) means to limit the value of said reference signal to a maximum value;
   (d) means to develop a second signal proportional to the quotient of the limited reference signal and said first signal;
   (e) means to limit the value of said second signal; and,
   (f) means to apply the limited second signal to the associated control for said second motor to effect control of the relative position of the wheel and the workpiece to thereby vary the pressure of the wheel on the workpiece and maintain substantially constant grinding power.

8. The invention in accordance with claim 7 wherein each of said means to limit, respectively, the values of said reference and said second signals includes an operational amplifier having a limiting circuit connected in a feedback path between the output and an input of said amplifier.

9. The invention in accordance with claim 7 wherein said means to provide said first signal is responsive to the terminal voltage and armature current of said first motor.

* * * * *